United States Patent [19]

Larrimore

[11] 3,781,786
[45] Dec. 25, 1973

[54] CODED TRACK MARKER LIGHT
[75] Inventor: Herbert Larrimore, Lynn Haven, Fla.
[73] Assignee: The United States of America as represented by the Secretary of the Navy, Washington, D.C.
[22] Filed: Sept. 5, 1972
[21] Appl. No.: 286,375

[52] U.S. Cl. ................................................. 340/29
[51] Int. Cl. ............................................... G08g 3/00
[58] Field of Search ................................ 340/25, 29

[56] References Cited
UNITED STATES PATENTS
2,913,702  11/1959  Ferguson et al. .................... 340/26
3,311,877  3/1967   Projector et al. .................... 340/29
2,559,415  7/1951   Field et al. ......................... 340/29 X Primary Examiner—William C. Cooper
Attorney—Richard S. Sciascia et al.

[57] ABSTRACT

A track marker light is disclosed as having a housing and barrel containing a light source, an optical system for projecting the radiant energy from said light source as a beam along a predetermined course to be traversed by a ship. A unique relatively rotating reticle and optical filter system is mounted in front of said light source and within said optical system to encodingly turn on and off the light beam being projected from said barrel, so as to enable a navigator having decoding knowledge thereof to navigate said ship along a fine line transition zone at the center of said radiant energy beam.

15 Claims, 9 Drawing Figures

CODED TRACK MARKER LIGHT

STATEMENT OF GOVERNMENT INTEREST

The invention described herein may be manufactured and used by or for the Government of the United States of America for governmental purposes without the payment of any royalties thereon or therefor.

FIELD OF THE INVENTION

The present invention relates, in general, to navigation instruments, and, in particular, it is a track marker light which facilitates the navigation of a ship or other vehicle along a desired course.

DESCRIPTION OF THE PRIOR ART

Heretofore, numerous devices have been used to navigate a vessel or vehicle along a predetermined course. For example, radar systems, sonar systems, channel markers, buoy systems, and various and sundry reference marker lights have been employed for such purpose. Although suitable for some purposes, in many instances each thereof leaves something to be desired. Most thereof have either been very complex, bulky, and costly, or the navigation reference accuracy thereof has been deficient for many practical purposes. Moreover, the operation of most thereof has necessitated that the human navigators or operators using them be highly trained and highly skilled, in order to take advantage of whatever optimum accuracies they may provide.

SUMMARY OF THE INVENTION

The subject invention overcomes many of the disadvantages of the prior art, in that the construction thereof is relatively simple, it is sufficiently portable to be deployed by one person within a short period of time, and ships and other vehicles can be navigated by people of very little training and skill with a degree of accuracy that provides safety and many of the other advantages necessary for expeditiously navigating a craft along a desired course. For instance, the navigation marker light constituting this invention provides a navigation reference that is sufficient for line navigation accuracy within one yard at a range of 2 miles to be effected.

It is, therefore, an object of this invention to provide an improved marker light.

Another object of this invention is to provide an improved method and means for facilitating the navigation of a predetermined vehicle along a desired essentially straight line course within predetermined environmental medium.

Still another object of this invention is to provide an improved method and means for navigating a ship or other marine vehicle along a straight line watercourse that is safe for the passage thereof.

A further object of this invention is to provide a track marker light having improved visibility.

A further object of this invention is to provide a navigation light that is not readily susceptible to being destroyed or disabled by thermally induced fracture.

Still another object of this invention is to provide a track marker light that may be deployed on a fixed shore mount or on a suitable stabilized platform within an aqueous or other environment.

Another object of this invention is to provide an improved method and means for effecting a glide path reference for an aircraft, a water craft, a space craft, or any other type mobile craft.

Still another object of this invention is to provide an improved method and means for navigating a ship safely into port.

Another object of this invention is to provide a track marker light that is easily and economically manufactured, deployed, used, and maintained.

Other objects and many of the attendant advantages will be readily appreciated as the subject invention becomes better understood by reference to the following detailed description, when considered in conjunction with the accompanying drawings.

BRIEF DESCRIPTION OF THE DRAWING

FIG. 4 is a cross-sectional view of the barrel of FIG. 1 and the rotary reticle and filter assembly located in proximity therewith;

DESCRIPTION OF THE PREFERRED EMBODIMENT

Figure 1:
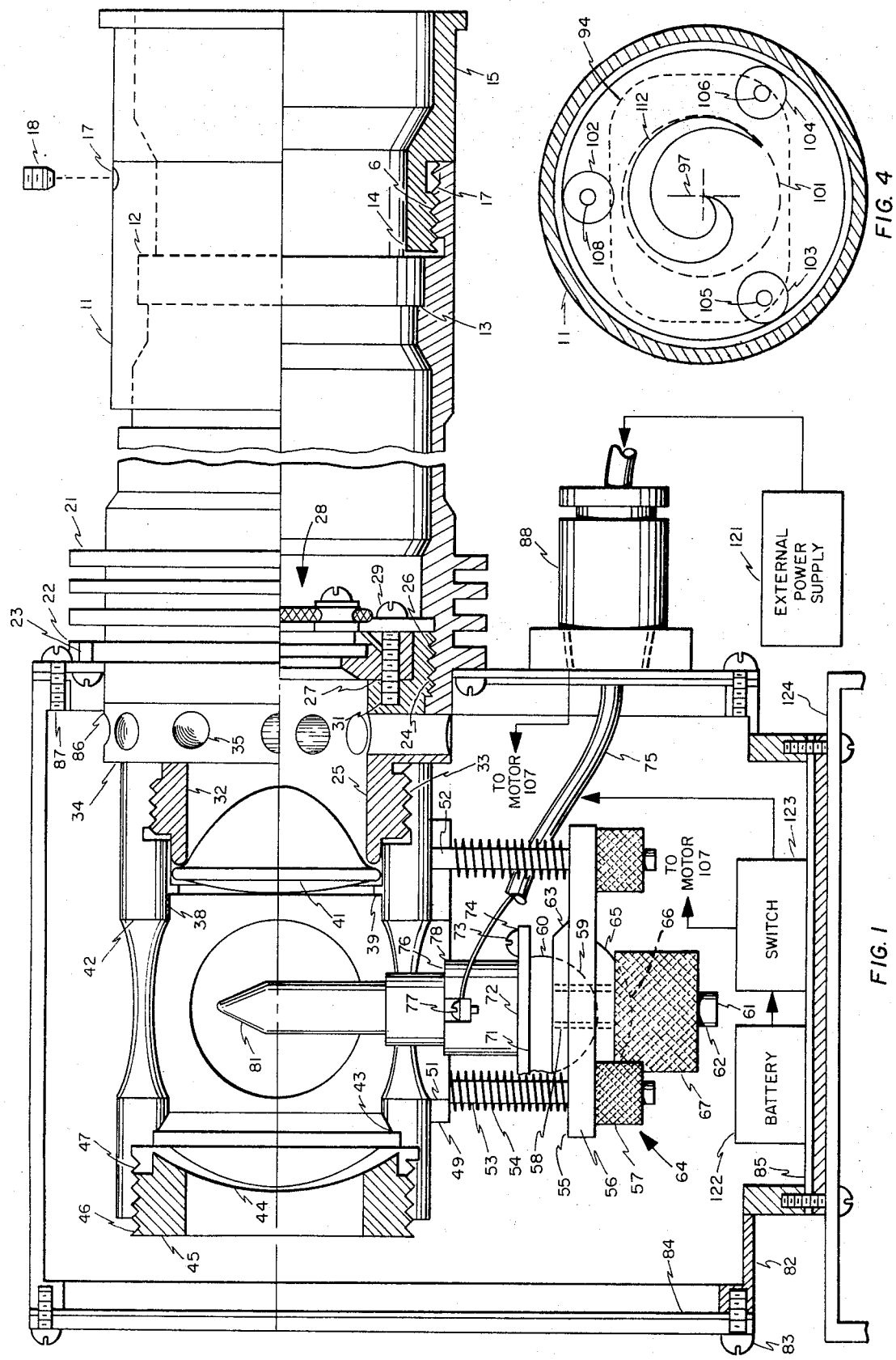
FIG. 1 is an elevational view, partly in cross-section and partly in block diagram form, of the track marker light constituting this invention.

Referring now to FIG. 1, the subject track marker light is shown as having an aluminum barrel 11 in which is disposed a front lens 12 that is held against a forwardly facing shoulder 13 within said barrel 11 by means of an O-ring 14 which is urged rearwardly by lens nut 15 having threads 16 which are screwed into forward barrel end threads 17. A set screw 18 is screwed into threads 19 in barrel 11 in such manner as to contact lens nut 15 and, thus, retain it firmly in its assembled position. Disposed around the outer periphery of barrel 11 is a plurality of cooling fins 21 which preferably extend from a location adjacent to the rear end of said barrel in a forwardly direction. In this particular instance, only three of said fins are shown; however, any number thereof may be employed as necessary to provide proper cooling for the entire barrel. Integrally connected to barrel 11 and near the rear end thereof is a flange 22 containing a plurality of screw holes 23. At the rear end of said barrel is located internal screw threads 24 in which is screwed a stainless steel coupling 25 by means of external screw threads 26 disposed upon the front end thereof.

Adjacent to the front end of coupling 25 is a shoulder 27 against which a rotary shutter assembly 28 is mounted by means of screws 29 extending therethrough and into threads 31 located in said shoulder 27 of coupling 25.

Rotary shutter assembly 28 is an important feature of the subject invention. Therefore, it will be discussed more fully in conjunction with FIG. 2 subsequently.

The rear end of coupling 25 contains an adapter portion 32 which, in turn, contains external screw threads 33. Also connected to coupling 25 at an intermediate location thereon is a flange 34 having a plurality of heat dissipation passageways 35 extending radially therethrough and into the bore thereof. External adapter threads 33 are screwed into internal threads 36 located in the front end of a hollow aluminum cylindrical housing 37. The forward end of said housing 37 has an aperture 38 therethrough extending along the longitudinal axis thereof in alignment with the longitudinal axis of the aforesaid barrel 11. A shoulder 39 is disposed therein in such manner that an aspheric lens 41 may be inserted and held firmly between the front end of said shoulder 39 and the rear end of the aforesaid coupling 25. Cylindrical housing 37 also has four apertures 42 extending at 90° intervals therearound which act as a light viewing and heat exit holes or apertures. Another shoulder 43 is located rearward of the aforesaid apertures 42 within housing 37 and extending around the longitudinal axis thereof in such manner that reflector 44 may be held in abutment thereagainst by means of a keeper 45 having external screw threads 46 which are screwed into internal screw threads 47 of the rear end of cylindrical housing 37. Of course, the aforementioned reflector 44 is concavely curved in the direction which will cause any light energy impacting thereon to be reflected in the forward direction through the aforementioned lens 41 and on out the front end of said barrel 11.

Connected to the lower side of cylindrical housing 37, as by welding or any other suitable means, is a plate 49 which has a large aperture 51 extending therethrough in alignment with upper and lower apertures 42 of said housing 37. Also located within plate 49 are a trio of threaded holes 52 adapted for receiving a like number of threaded studs 53 securely therein. Disposed around said studs 53 are a like plurality of springs 54 mounted for compression therearound between another plate 55 likewise having a plurality of holes 56 through which said studs 53 extend. At the lower end of said studs 53 is a like plurality of knurled nuts 57 which facilitate the adjustment of plate 55 along said studs 53 in opposition to the urging of springs 54. In alignment with the axis of the aforementioned upper and lower apertures 42 of housing 37 is another aperture 58 located through said support plate 55, and extending around the periphery thereof is a spherical-like concave surface which acts as a socket 59 in which a ball 60 is mounted for adjustment positioning. At the lower extremity of said ball and extending through said hole 58 is a stud 61 having screw threads 62 at the lower end thereof. Of course, stud 61 may be attached to ball 60 in any suitable manner, say, by welding, screw threads, or integral connection. If desired, the aforementioned socket 59 may be built up on the upper surface thereof in such manner as to have a boss 63 extending around an intermediate portion of the aforementioned ball 60, and in such instance, the combination of socket 59, ball 60, and boss 63 constitutes an adjustable ball-socket joint 64. Extending from the underside of support plate 55 and extending around aperture 58 is a spherically contoured convex extension 65 which, in turn, mates with a compatible spherically concave surface 66 disposed within the upper end of adjustable knurled nut 67 having internal screw threads (not shown) which allow it to be screwed on to the screw threads 62 of the lower end of the aforementioned stud 61.

Securely mounted on a flattened surface 71 of ball 59 is another support plate 72 which acts as a ground for electrical connection 73 to one of the lead wires 74 of electrical cable 75. And mounted on the top of said plate 72 is a lamp socket 76, likewise which contains electrical connection 77 which is connected to the other electrical lead wire 78 of said electrical cable 75. Within said electrical socket 76, is preferably disposed an iodine quartz lamp 81 of such geometrical configuration that the intense light energy generated thereby when electrically energized will travel forwardly through the aforementioned barrel 11 either directly through lines 41 and lens 12 or indirectly therethrough after being reflected by the aforementioned reflector 44.

Surrounding the aforementioned lamp 81 and associated components is a suitable waterproof housing 82. In this particular preferred embodiment said housing is shown as being assembled by sections held together with appropriate screws 83 and gaskets 84 and 85. Furthermore, it may readily be seen that the forward section thereof has a large aperture 86 through which the rear end of coupling 25 extends and to which the rearward plate 22 of said coupling 25 is bolted by means of bolts 87.

In order to provide a waterproof exit for electrical conduit 75, any suitable connector assembly 88 is connected to the aforementioned housing 82. Also, connector assembly 88 may be of such design as will allow it to accommodate several electrical conduits, including one which will be connected to the driving means of the aforementioned rotary reticle assembly 28.

Figure 2:
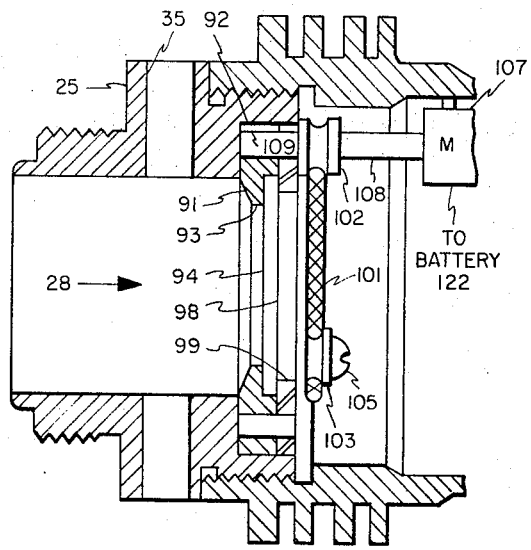
FIG. 2 is a cross-sectional view showing the structural association of the rotary reticle and filter assembly of FIG. 1.

Referring now to FIG. 2 and, in part, to the aforementioned FIG. 1, rotary shutter assembly 28 is shown in greater detail as having a frame 91 disposed in a circular inset 92 disposed within the inside diameter of the front end of coupling 25. Disposed along the axis of barrel 11 and within said frame 91 is an aperture 93, and held in place in front thereof is a filter 94, the left-hand half section 95 of which is green and the right-hand half section 96 of which is red and a center line 97 extending vertically therebetween being lapped clear for a width of $\lambda/2$, wherein $\lambda$ is the wavelength of the sodium D-line. Filter 94 is preferably heat treated to temper it, so as to make it fracture resistant when exposed to high temperatures or when exposed to rapidly changing temperatures. If heat treatment thereof is employed, it may be necessary to lap the abutting red and green edges twice - once before and once after heat treating, in order to provide an optimum fit therebetween.

Figure 3:
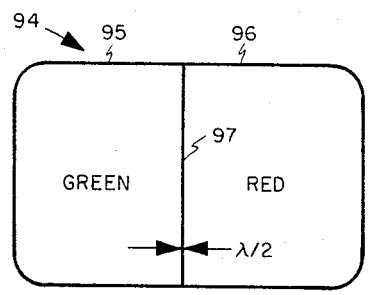
FIG. 3 is a symbolic representation of the filter assembly of FIGS. 1 and 2.

A front view of said red and green filter 94 is best seen in FIG. 3. A front frame 98 is disposed in front of said filter 94 in such manner as to hold filter 94 in place within rear frame 93. As may readily be seen, frame 98 also has an aperture 99 therethrough along the axis of the aforesaid barrel 11, so that light energy from lamp 81 may readily pass through the entire reticle assembly under certain circumstances. Disposed within the frontal area of frame 98 and covering the aperture thereof is a circular shutter 101, which is mounted for rotation between a top drive wheel 102 and a pair of lowered idler wheels 103 and 104 on bearing screws 105 and 106, respectively, the shutter of which may best be seen in FIG. 4. Of course, as may readily be seen, said shutter drive wheels and idler wheels are configured in such manner as to firmly hold rotary shutter 101 in place as it is rotated in front of filter 94. To effect rotation thereof, a drive motor 107 is connected by means of a shaft 108 to said shutter drive wheel 102, which is also connected to the rearward extension of shaft 108 for support within bearing holes 109 located within the upper end of rear and front frames 91 and 98. In this particular embodiment, drive wheel 102 drives rotary shutter 101 by friction; however, gear teeth or any other suitable means may be employed for such purpose, if so desired. Drive motor 108 is, of course, electrically driven and, thus, electrical leads are connected to any suitable electrical energy source, perhaps through the aforementioned connector assembly through which electrical conduit 75 passes.

Figure 5:
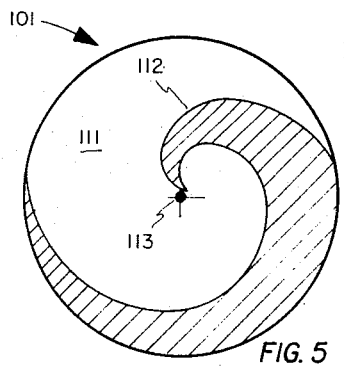
FIG. 5 is a schematic view of a preferred configuration of the rotary reticle of FIGS. 1, 2, and 4.
Figure 6:
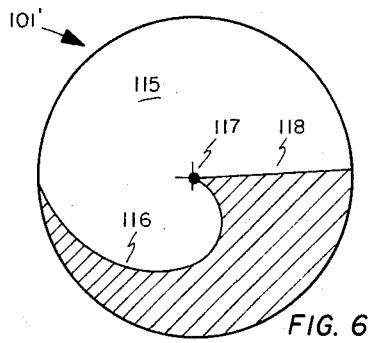
FIG. 6 is a schematic view of another preferred configuration of another rotary reticle that may be incorporated in the devices of FIGS. 1, 2, and 4.

FIGS. 5 and 6 show representative embodiments of circular rotatable shutters 101 and 101'. As seen in the shutter of FIG. 5, it contains a clear section 111 and a spiral-like opaque section 112. Said opaque spiral-like section of course starts adjacent to but not exactly on the center 113 of rotary shutter 101 and approaches the periphery thereof with an ever increasing cross sectional area until such time as it reaches the periphery thereof and extends in an ever decreasing cross section around it for a predetermined distance.

The aforementioned rotatable circular shutter 101 of FIG. 1 is, without limitation, herewith defined as being the preferred embodiment thereof that is incorporated in the instant invention. In order to more specifically define the shutter or light-stop aspect thereof, opaque area 112 is herewith disclosed as being bounded by a portion of the circular periphery thereof and by a pair of spiral lines conforming to the following mathematical expressions, respectively:

$$(\rho - a)^2 = 4ac\theta,$$

and $$(\rho - a)^2 = 8ac\theta,$$

where:

$\rho$ = the distance from each of the spiral lines to the center of the shutter;
$a$ = the radius of the circle of clear aperture,
$c$ = a constant for each line,
$\theta$ = the angle around the circular shutter.

The embodiment of shutter 101' shown in FIG. 6 likewise has a clear area 115 and an opaque area 116. Opaque area 116 likewise commences adjacent to but not exactly at center 117 of shutter 101' and extends directly to the periphery thereof. As shown, the upper portion of the opaque section 116 is a straight line 118 while the left-hand edge thereof is spiral-like in configuration and extends downwardly and leftwardly in a curve which ultimately reaches the circular periphery thereof.

The points of the opaque sections 112 and 116, respectively disclosed in FIGS. 5 and 6, preferably start at a distance that is one-quarter of the wavelength of the light broadcast by lamp 81 from the shutter centers 113 and 117. Hence, as will be more fully discussed below, when said shutters 101 and 101' are rotated, there is a center portion thereof that is transparent to light energy for a diametrical dimension of $\lambda/4$.

For the purpose of electrically energizing lamp 81 and electrically driving motor 107 an extended power supply 121 may be used as indicated in FIG. 1. Also, in the event it is desired to make the subject track marker light self-contained and portable, electrical power may be supplied to light 81 and motor 107 by means of a 28 volt battery 122 connected thereto through an on-off switch 123.

As a general rule, the type of mounting means employed to secure the subject instrument at some fixed position is determined by operational circumstances. Hence, it would appear to be sufficient to say that the aforesaid housing 82 may be mounted on any suitable support plate 124 which, in turn, as previously suggested, may be connected to any appropriate support means.

The aforementioned generally configured track marker light assembly has been disclosed herein in such manner that it would be well within the purview of one skilled in the art having the benefit of these teachings to construct such a light to make it effective for any given environmental and operational situation. Hence, it has only been generally disclosed as a new combination of elements which produce new and improved results that implement the objectives previously mentioned. However, without intending to limit the scope thereof, from this point on said track marker light will be more specifically designed in such manner that it will be readily useful in providing a very narrow line for visual navigation through narrow channels or other obstacles by boats or ships. Accordingly, the particular embodiment which will now be discussed in greater detail is intended to fulfill both the requirements of being portable and effective as a buoy mounted light. To fulfill such requirements, the weight and overall size of the entire instrument must be kept to a minimum. In the case of the buoy mounted light, the light must be servo driven for stabilization with a low inertia factor. Specifically speaking, said marker light is intended to be visible at a distance of 2 miles with the unaided eye during daylight hours when the atmospheric transmission of light is approximately 70 percent per mile. Of course, in order for said light to be small in size, portable, have a long life, and perhaps be battery operated, the operation thereof dictates that a high efficiency must be obtained in the conversion of electrical energy to a projected light beam while achieving the desired range of visibility.

It would perhpas be noteworthy at this time that, although the aforementioned filter 94 is depicted as having green and red half-sections, other combinations of colors such as green, red, blue, or yellow may be used, as long as the chromaticity of the corresponding beam is within the boundary limits for that color on the International Commission on Illumination Chromaticity Diagram. Furthermore, the circular rotary reticle should be so designed that the transition zone effectively occurring at the center thereof is sufficiently narrow so that when it is directed along the center line of a ship or other vehicle being navigated at maximum range from the subject light, the look-out person on the port side of the bridge thereof will see a green light, while the look-out person on the starboard side thereof will see a red light. If, in such case, for instance, the maximum look-out separation is assumed to be 10 feet, this corresponds to a maximum transition zone width of 8.33 × 10⁻⁴ radians or approximately 4.76 × 10⁻² degrees.

As previously suggested, the subject track marker light should be provided with sufficient cooling to protect the optical components thereof from heat damage and to reduce the safety hazard thereof to human personnel located nearby. Moreover, the subject instrument must be cooled sufficiently so that it will function satisfactorily in direct sunlight. In order to cause such conditions to exist, any suitable cooling system may be combined therewith, or, in the alternative, the housing and barrels, etc., may also be designed as to have cooling fins or other cooling means attached thereto as is necessary to effect optimum operation thereof for any given operational circumstances. So doing would, of course, obviously fall within the capabilities of the artisan constructing the subject track marker light by means of the teachings disclosed herewith.

Furthermore, it would appear to be noteworthy that since barrel 11 and cylindrical housing 38 are made of aluminum and are separated by stainless steel coupling 32, said coupling 32 would greatly restrict the flow of heat from said cylindrical housing to said barrel. Hence, barrel 11 and coupling 32 — which effectively contains the lens optical system — are less subject to being fractured by rapid ambient temperature variations, as would occur if the track marker light were moved from an atmospheric environment to an underwater environment while being lighted. In turn, such structural arrangement tends to prevent, or at least substantially reduce, the probabilities of inaccuracies from occurring due to rapid temperature changes.

The selection and design of the lenses incorporated in this invention are of considerable importance to the optimum operation thereof. The selection of the projector or objective lens 12 was governed more by physical size and cost than by basic lens design. Assuming that the system is diffraction limited, the resolution limit would be a function of the projector lens diameter and, thus, a trade-off must be made between resolution and physical size. Since the preferred embodiment herewith disclosed has been constructed to hold the diameter of barrel 11 to under 3 inches and a total instrument length to less than 2 feet, these size considerations dictated that the objective lens be no larger than 75mm in diameter, nor that they have a focal length longer than approximately 500mm. A standard 60mm by 375mm achromat lens meets these requirements and is inexpensive. The diffraction limit for such diameter lens is approximately 2.35 arc seconds, which corresponds to a resolution limit of 0.134 feet at a maximum range of 2 nautical miles.

Condenser lens 41 must be fast — that is, have a small aperture to focal length ratio — for efficiency. As shown in FIG. 1, it is near to and subjected to direct heat from the light of lamp 81 and, thus, must be heat resistant. The use of aspheric lenses, though not easily fabricated to extreme accuracies, as a general rule hold aberrations to a minimum and are inexpensive when molded. Because aspheric lenses provide fast lenses that are suitable for applications as condenser lenses where surface accuracy is not critical, such aspheric lens has been employed as condenser lens 41 in the preferred embodiment of FIG. 1. Nevertheless, to illuminate filters 94 evenly, aspheric condenser lens 41 must be lapped after molding and must be relatively free of zones. For this purpose, an off-the-shelf pyrex aspheric lens having a focal length of 26mm and a diameter of 43mm with an f/1.6 speed met the requirements of this light and, hence, was incorporated therein as condenser lens 41. With such lens, the light source 81 should be located just outside of the focal plane of the aspheric condenser lens 41, in order to cause its image to focus just outside of projector lens 12.

The aforementioned reflector 44 is a spherical collector mirror that is located behind lamp 81, with lamp filaments adjusted so as to be disposed at the center of curvature thereof. Reflector 44 collects the light that would otherwise be lost on that side of lamp 81 and reflects it back along its original path through the lamp to and through condenser lens 41. As with aspheric lens 41, a fast mirror is desirable for efficiency. The limit therefor is f/.25, which would be a hemisphere. However, for this application, a full hemisphere cannot be utilized because all of the light collected by mirror 44 could not be transmitted back to condenser lens 41 unless lens 41 is constructed in such manner as to be the same size and speed. If a line is drawn from the edge of condenser lens 41 through the center of the light source — that is, through the center of the light producing filament of lamp 81 — to the opposite edge of mirror 44, the light aperture of said mirror is indicated. Therefore, the limiting speed or efficiency of the subject collector-condenser arrangement is limited by the speed of condenser lens 41. Optimization of reflector 44 was effected by selecting a front surface pyrex that has a 52mm diameter and an 18mm focal length or an f/.35 speed.

In order to produce color coded beams which may be sighted by the human operators navigating the ship or other vehicle along its intended course, the aforementioned filters 94 should be located at the focal plane of projector lens 12 and in an aperture near condenser lens 41. Hence, they are disposed as best shown in FIG. 2 but also as partially shown in FIG. 1. Due to their location, filters 94 are subjected to heat from the radiated beam of light from lamp 81 and as a result of conduction along the metallic parts associated therewith, which are, likewise, subjected to the heat generated by lamp 81. Of course, the primary threat of destruction to filters 94 is caused by the aforesaid radiated energy from lamp 81, since the high intensity beam therefrom must be transmitted therethrough. Nevertheless, a lesser threat from the aforementioned conducted heat is also of sufficient threat to the entire instrument to make it necessary to alleviate it as much as possible, as by using the aforementioned stainless steel heat restricting coupling between the collector-condenser housing and the filter holder. Such construction is, of course, desirable because the exposure of filters 94 to excessive heat has two detrimental effects, viz., causes fracture thereof and also causes chromaticity shift to occur therein.

The construction of filter 94 is somewhat critical, in that the edges adjacent to the red and green sections thereof should be ground and lapped to a flatness of one quarter wavelength for the sodium D-line. So doing, of course, prevents the maximum separation of said red and green sections from exceeding ½ wavelength. When viewed down the projected beam from a distance by a human navigator, the line adjacent to the abutting lapped surfaces of said red and green sections would appear as a white zone at a distance of 2 miles from the subject instrument would be no more than 0.006 ft. and would be unresolved, due to the diffraction limit on resolution at that distance being 0.134 feet. Therefore, when crossing the beam from green to red, the human navigator or outlook of the vehicle being navigated should see green, yellowish-green, yellowish-red, and red in that order, since the white zone center would mix with either the red or the green or both, depending on the position of the viewer of the beam.

In order to optimize the radiant energy generated by lamp 81, a 75 Q/CL iodine-quartz lamp was selected, as previously indicated. This lamp is designed to operate on 28 volts which may be supplied by suitable direct current battery 122, and, in all probability, has a life expectancy of approximately 2,000 hours at said 28 volts. On the other hand, in the event a longer life for lamp 81 is required and a reduced output is acceptable, the voltage supplied thereto may be reduced. Conversely, where an extremely high output is required and a short life can be tolerated, lamp 81 of the aforementioned type may be operated at significantly higher voltages. The visibility requirement for the entire instrument is met when the lamp is operated at its aforementioned design voltage of 28 volts; but, of course, it may be operated from a variable power source and, thus, dimmed or brightened as necessary to conserve power or increase the visibility range thereof.

An important feature of the instant invention is the construction thereof in such manner that the position of lamp 81 may be adjusted to effect optimum focus and visibility thereof. To adjust lamp 81 in the vertical direction it is only necessary to make the proper adjustment of knurled nuts 57 in opposition to the urging of springs 54, and to effect the proper positioning of the filaments of said lamp 81, knurled nut 67 may be loosened and the movement of the lamp within its ball-socket joint effected until it is properly located at the intersection of the longitudinal axis of barrel 11 and the center line between the centers of upper and lower apertures 42 in housing 37 or at any other desired location. Of course, once positioned, knurled nut 67 is tightened to thereby cause a firm friction fit to exist between the bottom surface of ball 60 and the upper surface of spherical socket 59.

Adjustment of the filters should also be made so as to position them at the principal focus of the projector lens by screwing coupling 25, which holds the filters and aperture, in or out of barrel 11 as required. The principal focal point may be determined either with an illuminated diffraction grating and mirror or with a 3 inch or larger callimator. If excessive backward movement is required at the coupling, a spacer (not shown) may be inserted behind projector lens 12, so as to move it forward. For such purpose, set screw 18 is loosened to remove lens nut 15 so that said spacer may be installed and after installation thereof, it is properly tightened to prevent further movement thereof.

Figure 7:
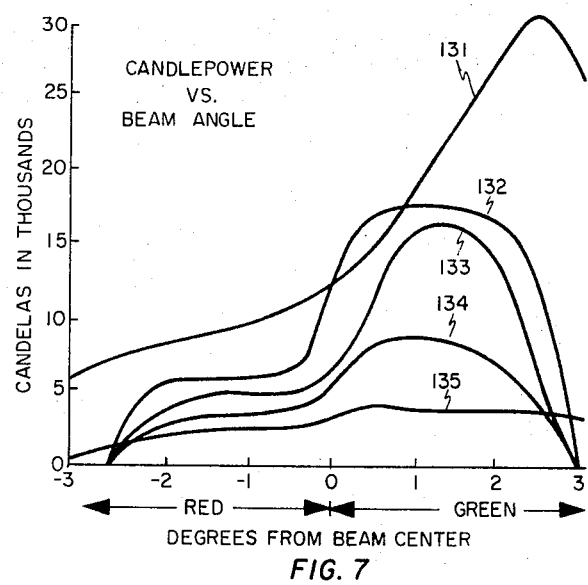
FIG. 7 is a graphical comparision of the light intensities of the instant invention and the known best prior art devices.

In order to insure operability of the instant track marker light and to ascertain that new and improved results were effected thereby, a photometric evaluation was made thereof. For example luminous intensity measurements were conducted thereon and compared to similar measurements made on the best known other lights of the prior art. The results of said measurements are graphically depicted in FIG. 7 in which candle power versus beam angle has been represented for each thereof. In this figure, the transition zone is shown as being located at the center of the abscissa with green on the right and red on the left thereof.

Referring again to FIG. 7, curve 131 represents the candle power versus beam angle that is obtained by the subject light. Curves 132 through 135 represent the candle power versus beam angle of the aforementioned lights of the prior art. Although it may be noted that at the transition zone the intensity is approximately the same for the subject invention and the light represented by curve 132, it should also be noted that the intensity of the subject track marker light is considerably higher than any of the lights of the prior art between the red angles of 0 to −3 degrees and between the green angles of 0 to +3 degrees, with 0 degrees constituting the center of the observed beam. Furthermore, it would appear to be noteworthy that the minimum intensity of the instant track marker light is approximately 5,000 candellas. This corresponds to a visual range of approximately 3 miles for 0.95 detection during mid-day with the sun at its zenith and with the atmospheric transmission being approximately 70 percent per mile. Thus, it may readily be seen, that when comparing curve 131 of the subject invention with curves 132 through 135 of the devices of the prior art, that the subject invention is superior thereto for many given operational purposes.

Figure 8:
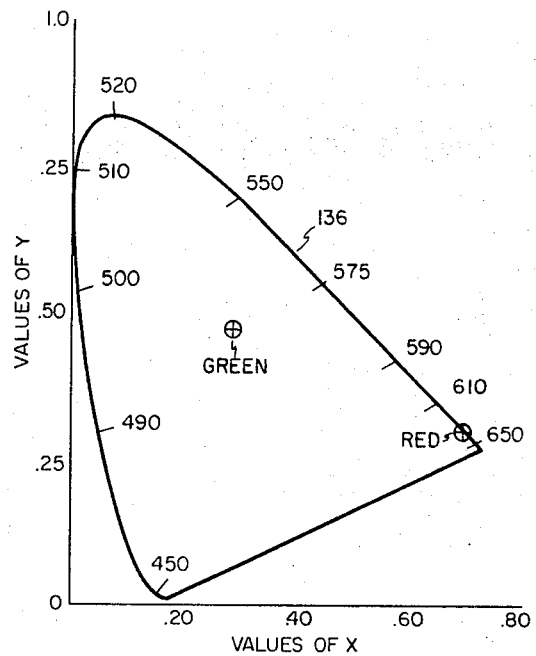
FIG. 8 is a chromaticity diagram which depicts the trichromatic coefficients of the red and green sectors of the filter of FIG. 3.

Again, because the chromaticity of instruments of the type constituting the subject invention are extremely important, the spectral energy distribution of the red and green portions of the beam of the subject light were measured with a Beckman model DB Spectrophotometer. The results of said mesurements are shown in the chromaticity diagram of FIG. 8, with the trichromatic coefficients of the red sector being $X = 70$ and $Y = 30$, and the trichromatic coefficient of the green sector being $X = 25$ and $Y = 47$. Hence, it may be seen that the trichromatic coefficients of both the red and green sectors fall within the allowable values represented by curve 136.

THEORY OF OPTIMUM CONSTRUCTION

In order to construct the subject invention in such manner that it will operate at optimum efficiency it was necessary to calculate various and sundry parameters, such as, for example, the diffraction limits thereof and the white zone thereof. Such calculations were made in the following manners:

With respect to the defraction limit, the theoretical resolution limit of an optical system is generally accepted to be $$\omega = 1.22 \lambda/D \quad (1)$$

where
  $\omega$ = angular resolution,
  $\lambda$ = wavelength,
  $D$ = diameter of aperture.

The selected values for the subject track marker light are as follows:

$$\lambda = 5.6 \times 10^{-5} \text{ cm},$$
$$D = 6 \text{ cm}.$$

Substituting these values in equation (1) yields $$\omega = 1.22 \times 5.6 \times 10^{-5}/6$$
$$= 1.14 \times 10^{-5} \text{ radians or } 2.35 \text{ arc seconds.}$$

At the maximum range of 2 miles, this angular spread corresponds to $1.14 \times 10^{-5} \times 12,000$ feet or 0.134 feet.

For the purpose of calculating the width of the transition zone, the following definitions will be used:

$Q$ = angle of white zone,
$a$ = filter polish accuracy in meters,
$d$ = focal length of projection lens in meters,
$R$ = working range in feet,
$X$ = width of white zone at R range in feet.

Then the maximum separation of the filter elements is $2a$, and $$2a/D = X/R \quad (2)$$

The known values of the subject track marker light are:

$a = \frac{1}{4} \lambda$ at center $\times 10^{-9}$ meters,
$d = 0.06$ meter,
$R = 12,000$ feet.

By substituting these values in equation (2), $$X = 2(600 \times 10^{-9}) \times 1.2 \times 10^4 / 0.06 \times 4$$
$$= 0.06 \text{ feet.}$$

From the foregoing, it may be seen that if the white transition zone could be resolved at 2 miles, as a result of the flatness of the abutting edges of the red and green sectors of filter 94 not exceeding one-quarter wavelength, it would not exceed 0.06 feet. Thus, the white transition zone would, indeed, be a very fine line which could be used as a reference for precisely traveling a predetermined course with safety and in a most expeditious manner.

MODE OF OPERATION

The operation of the present invention will now be discussed briefly in conjunction with all of the figures of the drawing, but primarily in connection with FIGS. 1 and 9.

Figure 9:
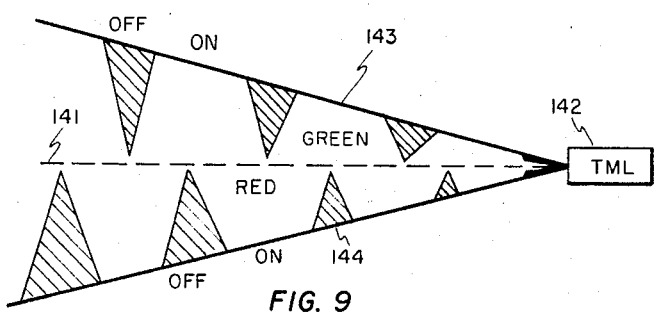

Referring first to FIG. 9, in the event that it is desired to travel from left to right along a straight line course 141 in order to avoid say submerged objects located within the aqueous area around a port, a track marker light (TML) 142 like that specifically disclosed in FIG. 1 is mounted in a fixed position at some location, either on land or on some other stabilized platform, in such manner that the light beam therefrom will be projected along said path or course 141. Assuming that the course 141 is the proper path to take for a ship to get into port, as it approaches said port it will come into the path of the projected beam, as defined by extremities 143 and 145. Assuming, for example, that the ship being navigated approaches the beam from the right thereof and, hence, sights the red color being projected through the red filter of the track marker light. As the ship travels in the general direction of said track marker light 142, the aforementioned rotary reticle 101 (or 101') is being rotated and, thus, the navigator observes the red light being turned on and off intermittently. But due to the unique configuration of said rotary reticle 101, the on-off periods thereof vary as the navigated ship travels toward the transition zone. Of course, as viewed in FIG. 9, if the ship is not approaching the transition zone, the off period will be considerably longer than it would be if the navigated ship were traveling toward the transition zone. In this way the navigator can turn his ship toward that course which causes the off duration of the blinking red light to be less and less. So doing causes the ship to be navigated toward the desired course 141. As the ship crosses said course 141, a momentary transition field of view is observed before encountering a blinking green light. At this time said ship is turned in such manner that the blinking green light will be off for lesser and lesser period of time. As a result of hunting back and forth across said transition zone, eventually the ship will be lined up on course 141 to the extent that the transition zone will be traversed as long as he is on course. Should he get off course momentarily, the navigator or his observers will observe either the green or red light beginning to blink at intervals and for durations which are proportional to the extent that he is off course. Depending upon which one is seen, corrective guidance can be effected.

From the foregoing it may readily be seen that one of the important facets of the subject invention is that the track marker light can be programmed in such manner that only navigators having knowledge of said program will be able to navigate safely along transition zone course 141. In effect, then, the instant track marker light 142 becomes a coded message broadcaster which enables any person having the code to decode it and, therefore, to travel safely along course 142 which, for example, may be threaded through various and sundry obstacles within the water of a port that would otherwise be dangerous or detrimental to a ship or other marine vehicle attempting to pass therethrough. Such coding, of course, is only possible as a result of the rotation of reticle 101 by its drive motor 107 in combination with green or red fliters 94 and the entire light and optical systems which cause radiant energy to be properly projected therethrough and for a considerable distance, say, 2 miles or so, along a course or path desired to be traveled. For such coding purposes, as previously suggested, the rotary reticles of FIGS. 5 and 6 are employed. They, of course, are just two of the many possible coding configurations that may be employed in the subject track marker light. Nevertheless, it has been found that the two configurations thereof shown in FIGS. 5 and 6, respectively, are imminently satisfactory for their intended purposes.

From the above, it may be seen that the subject track marker light constitutes a new and unique method and means for navigating a predetermined vehicle along a particular course or path and that is does so in such manner that it constitutes a considerable advancement in the art of navigating a vehicle through an otherwise dangerous or deleterious environmental medium.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A track marker light, comprising in combination:
   a barrel having a bore therethrough along the longitudinal axis thereof;
   an objective lens removably and adjustably mounted in the bore of said barrel in proximity with the front end thereof;

a heat restriction coupling, having an aperture therethrough, removably and adjustably mounted in the bore of the rear end of said barrel in such manner as to extend rearwardly therefrom;

a cylindrical housing, having open front and rear ends, a plurality of heat-venting apertures through the wall thereof, and a pair of inwardly extending shoulders respectively located forwardly and rearwardly from said heat-venting apertures, with the open front end of said coupling connected to the rear end of said coupling;

an aspheric condenser lens effectively disposed between the front surface of the forwardly located one of said inwardly extending shoulders of said cylindrical housing and the rear end of said coupling;

a forwardly facing concave reflector securely mounted within the open rear end of said cylindrical housing and against the rear surface of the rearwardly located one of said inwardly extending shoulders thereof;

lamp means effectively connected to said cylindrical housing in such manner that the filament portion thereof is located between said aspheric condenser lens and said reflector and substantially on a rearward extension of the longitudinal axis of the aforesaid barrel, so as to beam light energy therethrough; and means connected between said cylindrical housing and said lamp means for adjusting the position thereof in any direction within said cylindrical housing.

2. The invention of claim 1, further characterized by means disposed within said heat restriction coupling in alignment with the aperture thereof for color coding the light passing therethrough.

3. The invention of claim 1, further characterized by shutter means disposed in alignment with the aperture of said heat restriction coupling for the timely stopping and passing of radiant energy therethrough.

4. The invention of claim 1, further characterized by a waterproof housing connected to the rear end of said barrel in such manner as to provide a waterproof environment for said heat restriction coupling, said cylindrical housing, said aspheric condenser lens, said forwardly facing concave reflector, said lamp means, and the aforesaid means connected between said cylindrical housing and said lamp means for adjusting the position thereof in any direction within said cylindrical housing.

5. The invention of claim 1, further characterized by means effectively connected to said barrel and the track marker light incorporating said barrel for the cooling thereof.

6. The invention of claim 1, further characterized by means connected to said track marker light for the mounting thereof in a fixed position within a predetermined environmental medium.

7. The invention of claim 1, further characterized by means effectively connected to said lamp means for timely supplying electrical power thereto.

8. The invention of claim 1, further characterized by:
a battery; and
a switch connected between the output of said battery and the input of the aforesaid lamp means for the turning on and off thereof.

9. The device of claim 1, wherein said barrel is an aluminum barrel, wherein said coupling is a stainless steel coupling, and said cylindrical housing is an aluminum cylindrical housing.

10. The device of claim 1, wherein said objective lens is a 60 mm by 375 mm achromat lens.

11. The invention of claim 1, wherein said aspheric condenser lens is a pyrex aspheric lens having a focal length of 26 mm and a dimater of 43 mm.

12. The device of claim 1, wherein said lamp means comprises:
a 75 Q/CL iodine-quartz lamp; and
a socket effectively connected to said adjusting means and releasably connected to the aforesaid lamp for the support thereof in a predetermined spatial disposition between the aforesaid aspheric condenser lens and forwardly facing concave reflector.

13. The device of claim 1, wherein said means connected between said cylindrical housing and said lamp means for adjusting the position thereof in any direction within said cylindrical housing comprises:
a lamp socket;
an upper plate, having a trio of spatially disposed threaded holes disposed around a central aperture, connected to the lower portion of said cylindrical housing in such manner that said central aperture is in alignment with the lower one of said heat-venting apertures extending through the wall thereof;
a trio of threaded studs respectively screwed into the trio of threaded holes of said upper plate and extending downwardly therefrom;
a lower plate having a central aperture and a trio of holes extending therethrough, with the trio of holes thereof having the aforesaid trio of studs extending therethrough;
a trio of adjustable knurled nuts respectively screwed on the lower threaded ends of said trio of studs;
a concave surface located within the upper surface of the aforesaid lower plate and extending around the central aperture therein;
a ball, having a flat upper surface and a convex lower surface, with the upper flat surface thereof connected to the lower surface of the aforesaid socket, and with the lower convex surface thereof disposed in complementary slidable abutment with the concave surface in the upper portion of said lower plate;
a convex surface connected to the lower side of said lower plate around the central aperture thereof;
another threaded stud connected to the lower end of the aforesaid ball and extending through the central aperture of the aforesaid lower plate and its concave and convex surfaces;
another knurled nut, having a concave upper surface in compatible abutment with the aforesaid convex surface located on the underside of the aforesaid lower plate, screwed on the end of said another threaded stud.

14. The invention of claim 1, further characterized by:
a filter having a green section and a red section separated by a lapped vertical intersection therebetween disposed in said heat restriction coupling in alignment with the aperture thereof;
a rotatable shutter having a predetermined opaque spiral section and a clear section complementary therewith mounted for rotation in front of said filter; and means connected to said rotay shutter for the rotation thereof at a predetermined number of revolutions per minute in front of said filter or flap shutters.

15. The device of claim 14, wherein the opaque spiral section of the aforesaid rotatable shutter is defined as being bounded by a predetermined circular portion of the periphery thereof and by a pair of spiral lines respectively conforming to the mathematical expressions $$(92 - a)^2 = 4ac\theta,$$

and $$(\rho - a)^2 = 8ac\theta,$$

where $\rho$ = the distance from each of said spiral lines to the center of said rotatable shutter, $a$ = the radius of the circle of clear aperture of said rotatable shutter;

$c$ = a predetermined constant for each line, and $\theta$ = the angle around the circular shutter.

* * * * *